United States Patent
Kumar et al.

(10) Patent No.: US 12,417,107 B2
(45) Date of Patent: Sep. 16, 2025

(54) ENTERPRISE APPLICATION RUNTIME CUSTOMIZATION AND RELEASE MANAGEMENT

(71) Applicant: Oracle International Corporation, Redwood Shores, CA (US)

(72) Inventors: Vivek Kumar, Redwood Shores, CA (US); Kamyar Seradjfar, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 75 days.

(21) Appl. No.: 17/585,353

(22) Filed: Jan. 26, 2022

(65) Prior Publication Data

US 2023/0236849 A1 Jul. 27, 2023

(51) Int. Cl.
| | |
|---|---|
| *G06F 9/451* | (2018.01) |
| *G06F 8/30* | (2018.01) |
| *G06F 8/38* | (2018.01) |
| *G06F 8/41* | (2018.01) |
| *G06F 8/51* | (2018.01) |
| *G06F 8/656* | (2018.01) |
| *G06F 8/70* | (2018.01) |
| *G06F 8/71* | (2018.01) |
| *G06F 8/76* | (2018.01) |

(Continued)

(52) U.S. Cl.
CPC ............ *G06F 9/451* (2018.02); *G06F 8/30* (2013.01); *G06F 8/38* (2013.01); *G06F 8/447* (2013.01); *G06F 8/51* (2013.01); *G06F 8/656* (2018.02); *G06F 8/70* (2013.01); *G06F 8/71* (2013.01); *G06F 8/76* (2013.01); *G06F 8/43* (2013.01); *G06F 16/14* (2019.01); *G06N 20/00* (2019.01)

(58) Field of Classification Search
CPC . G06F 9/451; G06F 8/656; G06F 8/70; G06F 8/71; G06F 16/14; G06F 8/76; G06F 8/30; G06F 8/38; G06F 8/35; G06F 8/43; G06F 8/447; G06F 8/51; G06N 20/00
See application file for complete search history.

(56) References Cited

U.S. PATENT DOCUMENTS 9,183,120 B1 * 11/2015 Webb ..................... G06F 8/76
9,430,229 B1 * 8/2016 Van Zijst ............. G06F 9/3844
(Continued)

*Primary Examiner* — Roberto Borja
(74) *Attorney, Agent, or Firm* — Invoke

(57) ABSTRACT

Techniques for runtime customization and management of user interfaces for enterprise applications are disclosed. In some embodiments, the techniques include tools, systems, and processes for building frontend, technology-independent user interfaces. A system may consume user input files that are language dependent and generate a metadata file that is language independent. The metadata file may be updated to customize or otherwise modify a user interface of an application at runtime. An event signal may be raised to notify the application when a new user interface is available. In response to detecting the signal, the application may refresh the user interface, including the application page being currently viewed, to modify the set of user interface components that are rendered and displayed to the end user. The system may store metadata for multiple versions of the user interface to allow users to quickly roll back to prior versions of a user interface.

19 Claims, 8 Drawing Sheets

(51) Int. Cl.
*G06F 16/14* (2019.01)
*G06N 20/00* (2019.01)

(56) References Cited

U.S. PATENT DOCUMENTS

| | | | | |
|---|---|---|---|---|
| 2003/0226132 | A1* | 12/2003 | Tondreau | G06F 8/51 |
| | | | | 717/136 |
| 2009/0210861 | A1* | 8/2009 | Alupului | G06F 8/73 |
| | | | | 717/123 |
| 2010/0192167 | A1* | 7/2010 | Feies | G06F 8/38 |
| | | | | 719/331 |
| 2012/0317504 | A1* | 12/2012 | Patel | G06F 9/451 |
| | | | | 715/762 |
| 2017/0147306 | A1* | 5/2017 | Weber | G06F 8/48 |
| 2020/0073921 | A1* | 3/2020 | Bradley | G06F 40/174 |
| 2020/0081691 | A1* | 3/2020 | Gupta | G06N 3/082 |
| 2020/0311295 | A1* | 10/2020 | Fox | G06F 21/563 |
| 2021/0034356 | A1* | 2/2021 | Zhou | G06F 9/45508 |
| 2021/0409810 | A1* | 12/2021 | Li | H04N 21/4821 |
| 2022/0206785 | A1* | 6/2022 | Singh | G06F 8/51 |
| 2022/0326917 | A1* | 10/2022 | Chintala | G06F 8/38 |

\* cited by examiner

ENTERPRISE APPLICATION RUNTIME CUSTOMIZATION AND RELEASE MANAGEMENT

TECHNICAL FIELD

The present disclosure relates to software application architecture and design. In particular, the present disclosure relates to techniques for building frontend, technology-independent user interfaces.

BACKGROUND

When building an application interface, many different factors are typically taken into consideration by a designer to optimize the user experience. For example, the designer may determine an optimal layout, flow, look, and feel for the interface so that a user may intuitively navigate through different application pages. After an initial build of an application interface, a designer may wish to modify all or a portion of the application interface to improve the user experience. However, once an application is in production, rebuilding the application interface often requires modifications to the underlying application source code, which is a cumbersome and error-prone process. In addition, customizing the user interfaces often requires downtime to accommodate the updated application source code. The development and downtime burdens of updating enterprise applications may incur significant costs on enterprise clients and negatively impact the end user experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
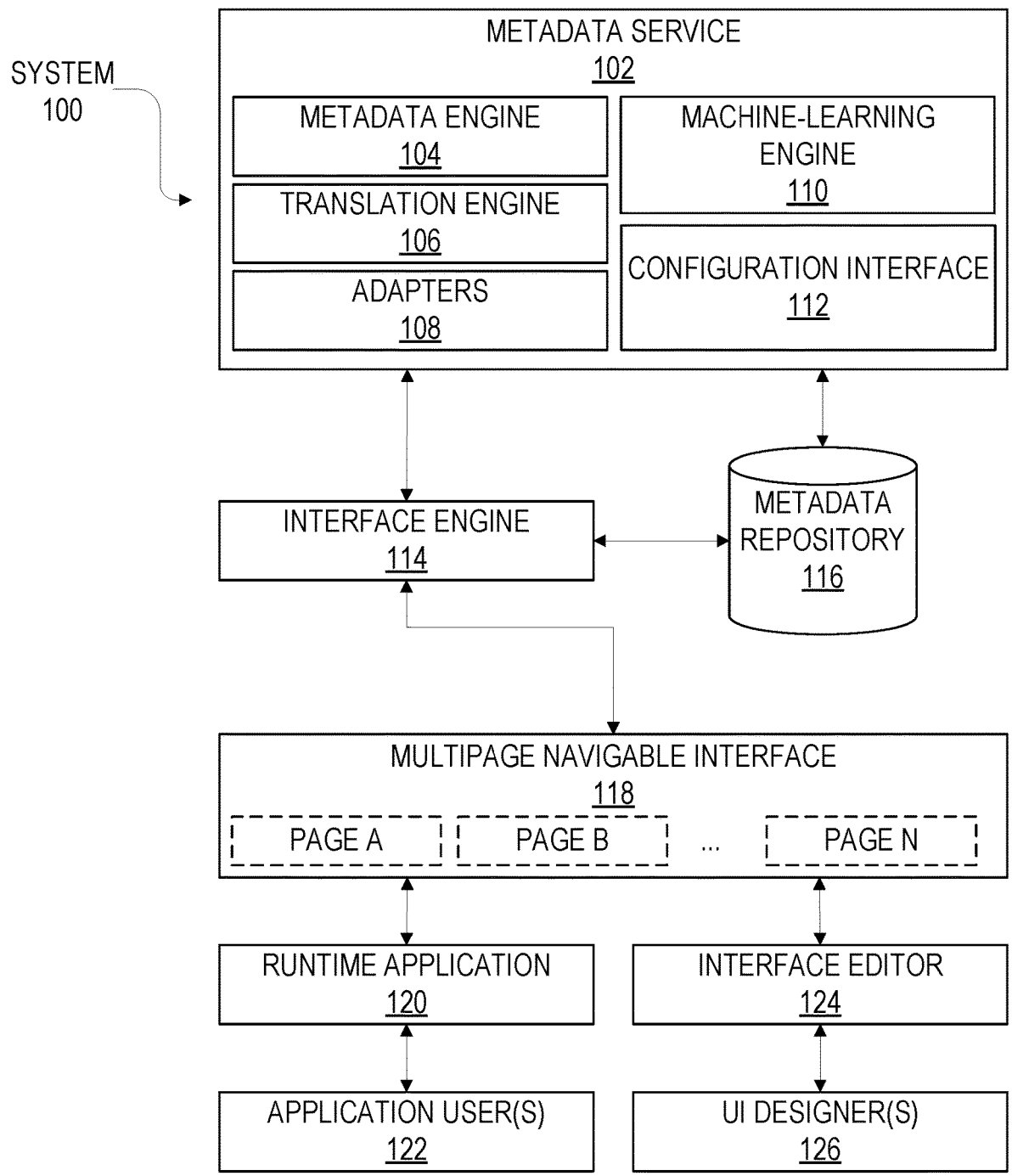
FIG. 1 illustrates a system for runtime customization and management of user interface releases in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. BI-DIRECTIONAL METADATA SERVICE
   3.1 GENERATING LANGUAGE-INDEPENDENT METADATA BASED ON LANGUAGE-SPECIFIC USER INTERFACE FILES
   3.2 GENERATING LANGUAGE-SPECIFIC USER INTERFACE FILES FROM LANGUAGE-INDEPENDENT METADATA
   3.3 MACHINE LEARNING INFERENCES
4. RUNTIME USER INTERFACE UPDATES
   4.1 METADATA REPOSITORY
   4.2 CONFIGURATION MANAGEMENT
   4.3 ROLLBACK OPERATIONS
5. COMPUTER NETWORKS AND CLOUD NETWORKS
6. MICROSERVICE APPLICATIONS
7. HARDWARE OVERVIEW
8. MISCELLANEOUS; EXTENSIONS

1. General Overview

Systems, processes, and tools are described herein for building and deploying technology-independent user interfaces. In some embodiments, the techniques include separating the user interface layer of an application from the application layer using a metadata layer. The techniques allow developers to seamlessly transition between different languages and technologies when building a user interface without requiring manual changes to the underlying application source code. The techniques further allow for enterprises to customize and release new user interface designs with zero or near-zero application downtime.

In some embodiments, a metadata layer comprises a service that converts language-specific user interface files to language-independent metadata representations. The conversion may provide flexibility in transitioning between different user interface technologies. For example, the user interface application may include files that conform to a particular user interface specification, including code written in a language-specific syntax defined by the specification. If a developer wishes to change to a different user interface technology that has a separate user interface specification, then the metadata service may translate the files conforming to the previous user interface specification to an intermediate, metadata document that is independent of user interface programming language specifications.

In some embodiments, the metadata service is bi-directional when transitioning between different user interface specifications. For example, the metadata service may convert user interface files conforming to a source user interface specification to a metadata representation, which may subsequently be used to generate user interface files conforming to a destination user interface specification. The metadata service may further convert user interface files conforming to the destination user interface specification to a metadata representation, which may then be used to generate user interface files conforming to the first user interface specification. Thus, user interface designers may quickly transition back and forth between different user interface technologies when customizing a user interface for an application.

In some embodiments, the metadata layer allows changes to the user interface application during application runtime. The users may submit customizations or other modifications to the user interface to the metadata service, which may generate a metadata representation of the new user interface. When the user saves or publishes an update, the metadata service may generate an event signal to notify the application. In response to the signal, the application may identify the updated metadata representation for the user interface and refresh one or more user interface pages using the updated metadata representation, including the application page that an end user is currently viewing. The refresh may be performed during runtime without restarting the application.

In some embodiments, the metadata layer facilitates management of different versions of a user interface. When a user submits changes to a user interface, a new metadata representation is generated and mapped to a new version of the user interface. Metadata representations mapped to previous versions may be maintained to allow a user to rollback in the event that any issues are detected in the new version of the user interface. During rollback operations, the metadata representation for the previous version of the user interface may be loaded and used to refresh one or more application pages.

One or more embodiments described in this Specification and/or recited in the claims may not be included in this General Overview section.

2. System Architecture

FIG. 1 illustrates a system for runtime customization and management of user interface releases in accordance with some embodiments. As illustrated in FIG. 1, system 100 includes metadata service 102, interface engine 114, metadata repository 116, multipage navigable interface 118, runtime application 120, and interface editor 124. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, metadata service 102 is part of a metadata layer of an application or software system. The metadata layer, including metadata service 102, may be distinct from the presentation layer and application layer of a multi-tier software application. Metadata service may generally include metadata engine 104, translation engine 106, adapters 108, machine-learning (ML) engine 110, and configuration interface 112. However, as previously mentioned, the components of system 100, including subcomponents, may vary depending on the particular implementation.

Metadata service 102 may be an external cloud service, such as a software as a service (SaaS), part of the same cloud service as one or more other components of system 100 or may otherwise be part of a networked service. Additional embodiments and/or examples relating to computer networks are described below in Section 5, titled Computer Networks and Cloud Networks and Section 6, titled Microservice Applications.

In some embodiments, metadata engine 104 consumes language-dependent user interface files and outputs a language-independent metadata representation of the user interface defined by the consumed files. A language-dependent or language-specific user interface file refers to a file that are written or otherwise depend on a programming language that conforms to a user interface specification. Example user interface technologies and specifications include Oracle Visual Builder, Ionic Framework, and React.js. Metadata engine 104 may be configured to generate normalized metadata representations for user interface files conforming to a variety of different user interface frameworks and specifications.

In some embodiments, translation engine 106 translates metadata representations of a user interface to a runtime version of the user interface. Additionally or alternatively, translation engine 106 may translate the metadata representation to a set of one or more user interface files that conform to a destination user interface specification, such as Oracle Visual Builder, Ionic Framework, React.js, and/or other user interface frameworks.

In some embodiments, flow definitions 116 include a high-level description of the flow of an application. A flow definition may include semantic data describing transitions and functions at various application stages. The flow definition may be defined semantically using one or more development tools that provide a visual interface for defining an application flow. For example, a cloud-based service or application may allow a developer to create a set of visual nodes and input one or more application functions associated with the node. The user may further connect nodes using lines or edges to define dependencies and/or transitions between different application functions.

In some embodiments, adapters 108 provide a layer between user interface components and underlying data, which may be stored in an application database. When binding a data object or application code to a component, the binding may take place through an adapter. During updates, components associated with an adapter may be swapped, allowing the interface to be redesigned without affecting the underlying application data and source code.

In some embodiments, ML engine 110 trains ML models to learn relationships and patterns within a training set of user interface example. For example, ML engine 110 may learn relationship patterns between display attributes and other component parameters in the training dataset. ML engine 138 may use the trained models to select user interface components and/or component parameters when generating a metadata representation of the interface and/or when converting the metadata representation to a language-dependent user interface file.

In some embodiments, configuration interface 112 provides an interface through which enterprise users may perform customization and updates to the user interface. Configuration interface may execute in parallel with runtime application 120. Thus, a user may submit updates to the user interface during application runtime without restarting or halting operation of the application.

Interface engine 114 renders and presents multipage navigable interface 118 based on the metadata representation of the interface. In some embodiments, interface engine 114 directly consumes the metadata representation and generate multipage navigable interface 118 based on the user interface components defined therein. In other embodiments, translation engine 106 may provide a framework-specific and/or language-specific set of user interface files that conform to a user interface specification implemented by interface engine 114. Interface engine 114 may then generate and render multipage navigable interface 118 based on the provided user interface files in accordance with the corresponding user interface specification.

In some embodiments, metadata repository 116 stores metadata representations of multipage navigable interface 118. Metadata repository 116 may store multiple metadata representations for multipage navigable interface 118, allowing users to switch between different versions of a user interface page. Metadata repository 116 may be any type of storage unit and/or device (e.g., a file system, database, collection of tables, or any other storage mechanism) for storing data. Further, metadata repository 118 may include multiple different storage units and/or devices. The multiple different storage units and/or devices may or may not be of the same type or located at the same physical site. Further, metadata repository 118 may be implemented or may execute on the same computing host as one or more other components of system 100 Alternatively or additionally, metadata repository 118 may be implemented or executed on a computing system separate from the components of system 100. Metadata repository 118 may be communicatively coupled to the other components via a direct connection or via a network.

In some embodiments, multipage navigable interface 118 is a frontend interface for application users 122 to interact with runtime application 120. For example, users may interact with user interface components within multipage navigable interface 118 to navigate through different application pages, invoke application functions, access application data, and/or perform other application-specific functions. Multipage navigable interface 118 may include a graphical user interface (GUI) including several different application pages. Multipage navigable interface 118 may further support a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In some embodiments, one or more user interface (UI) designers 126 may modify a user interface during application runtime using interface editor 124. Interface editor 124 may access and present multipage navigable interface 118 to present the interface to UI designers 126 as the interface would appear during application runtime. Interface editor 124 may include a GUI that allows UI designers 126 to modify the look, feel, and functionality of multipage navigable interface 118. The GUI may allow the customizations to performed using visual tools, such as dragging and dropping user interface elements to change a page layout and formatting the components to change the look, feel and/or function of the components. Additionally or alternatively, the GUI may allow UI designers 126 to view the metadata representation and/or language-specific code, which UI designers 126 may manually edit to customize the design of multipage navigable interface 118.

In some embodiments, components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Bi-Directional Metadata Service 3.1 Generating Language-Independent Metadata Based on Language-Specific User Interface Files In some embodiments, metadata engine 104 generates metadata representations for various user interface components. Example user interface components include data visualizations, navigation components, page layouts, page flows, display information, and page actions. A brief description of each of these components is provided below.

In some embodiments, data visualizations are used to present abstract information in a graphical form. Examples include histograms, pie charts, and graphs. Data visualizations may be associated with a binding interface that accesses data within an application database. Each component may consume data differently. For example, a data collection component may present a visual list of rows whereas a data visualization may aggregate values from the rows to render a graphical representation. Different types of data visualization components may also render different graphics for the same set of data, depending on the implementation. Designers may swap components and/or modify core component functions independently, and metadata engine 104 may update the metadata representation accordingly.

Navigation components are user interface components that control how a user may navigate through different pages of an application interface. For example, a navigation component may define the location and appearance of a "Back" button. Additionally or alternatively, a navigation component may define and encapsulate various functions for the button. In some cases, a user may be prompted to confirm whether they would really like to leave the current page or to save the current information in a draft state. In other cases, the back button may jump to the previous page without any prompt. Other functions may also be defined, depending on the particular application and selected navigation component. The user experience of navigating within the interface may be completely encapsulated by navigation components.

Page layout may define how user interface components are arranged on a page. For example, a page layout may determine the size and position of the components, the spacing between components, page themes including backgrounds and colors, and typographical design including fonts and font sizes. The layout of user interface elements may be specified in a style sheet language, such as Cascading Style Sheets (CSS), or using other computer languages.

Display information may identify what information to display within an interface. Display information may include customized and user-specified text. For example, a user may specify a title or other text to be displayed in association with a page or action. Additionally or alternatively, the display information may include customized and user-specified images. Display information may link user-specified text and/or images with one or more user interface components, which may present the text and/or images at a specified location within or relative to the linked component.

Page action components may define action that are invokable through a user interface page. Actions may include primary actions, and/or secondary actions. A primary action may correspond to any action that initiates at least one database transaction when invoked, and a secondary action may correspond to any action that does not initiate a database transaction. For instance, a user may hit submit to commit the current state information displayed in the user interface page to an underlying database as a primary action. As a secondary action, the user may hit a print button to print the page in its current state, which may not initiate a commit of the data in some implementations. In other embodiments, a primary action may be one cause state information associated with an application page to be saved, and a secondary action may be one that does not trigger a save in the state information. For instance, a secondary action may use data entered into an application page to generate a visualization without committing the data to a database or otherwise persistently storing the data.

Composite components may be built from two or more other user interface components, including any of the user interface components previously identified. For example, a composite component may include a combination of layout information, a data visualization, and display information. Designers may modify or edit user interface components using one or more user interface frameworks to optimize the application design.

Different user interface programming languages, specification, and frameworks may define different syntax to build user interface components, including those listed above. Metadata engine 104 may generate metadata representations for each user interface component independent of the language or framework-specific syntax. As a result, metadata engine 104 may generate the same metadata representation of a user interface component from user interface files conforming to different user interface specifications even though the user interface component is defined using different syntax and programming language constructs.

Figure 2:
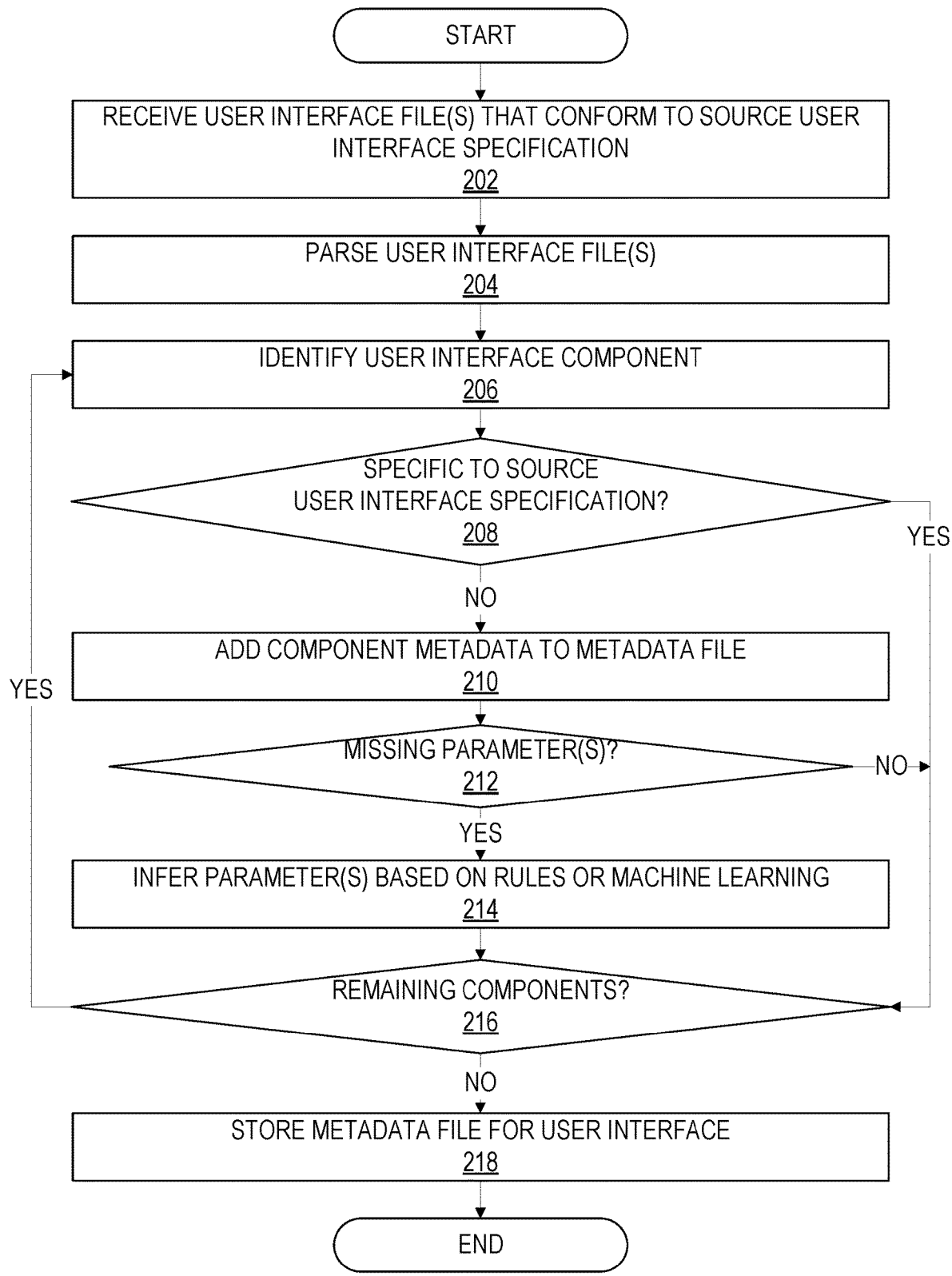
FIG. 2 illustrates an example set of operations for generating a set of language-independent metadata for a user interface based on a set of language-dependent source files in accordance with some embodiments.

FIG. 2 illustrates an example set of operations for generating a set of language-independent metadata for a user interface based on a set of language-dependent source files in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, the process receives one or more user interface files that conform to a source user interface specification (operation 202). As previously indicated, the source user interface specification may vary depending on the particular implementation. The user interface files may include code, syntax, and/or other content that is dependent on a programming language and/or framework that is specific to the user interface specification.

Figure 3:
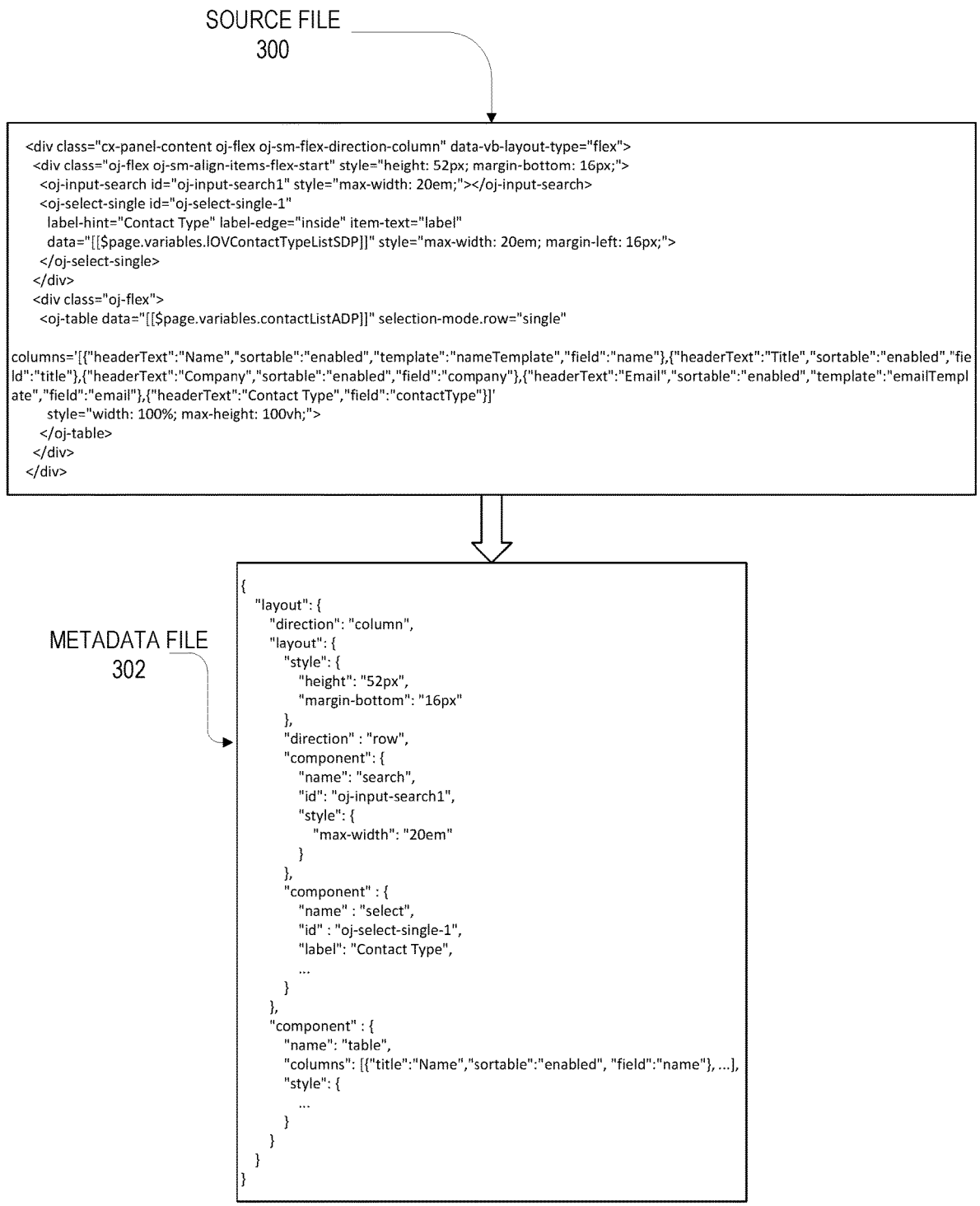
FIG. 3 illustrates an example conversion of a language-dependent source document to a language-independent metadata document in accordance with some embodiments.

FIG. 3 illustrates an example conversion of a language-dependent source document to a language-independent metadata document in accordance with some embodiments. Source document 300 defines a user interface using a syntax specific to Oracle Visual Builder. For example, source document 300 references classes and packages that are specific to the Oracle Visual Builder framework.

Referring again to FIG. 2, the process parses the one or more user interface files (operation 204). During the parsing operation, the process may perform lexical and/or semantic analysis to tokenize the data based on the syntax associated with the source user interface specification. In the example with source document 300, for instance, the process may parse the document to identify tokens based on the syntax specific to the Oracle Visual Builder framework.

Based on the parsing, the process identifies a user interface component (operation 206). For example, the process may identify a button, radio box, navigation component, layout component, or any of the other user interface components previously mentioned.

Responsive to identifying the user interface component, the process determines whether the component is specific to the source user interface specification (operation 208). Certain components, such as classes and packages, may be specific to a particular framework, which may not be feasible to represent in metadata or may not have any meaning outside of the particular framework. In such cases, the component may be ignored and not added to the metadata representation, and the process may jump ahead to operation 216.

If the component may be represented in metadata, then the process adds component metadata to a metadata file (operation 210). The component metadata may include one or more parameters including a name for the component, display attributes for the component, data bound to the component, actions bound to the component, and/or other information describing how the component is to be rendered in a user interface page. In some embodiments, the component metadata and metadata file do not conform to the source user interface specification. For example, the component metadata may be defined independently of programming languages, syntax, and other parameters particular to the user interface specification. An interface engine solely implementing the source user interface specification may thus be unable to render a user interface from the metadata representation.

In some embodiments, the process determines whether there are any missing parameters in the component metadata (operation 212). In some instances, the process may not be able to extract an expected parameter, such as the layout or other design attribute, expected for the component metadata. This scenario may occur where parameters may be determined in class-specific packages, class objects, or fields that are not provided in the set of user interface files.

If a parameter is missing, then, in some embodiments, the process infers the parameter based on a set of rules of machine learning (operation 214). As an example rule-based approach, the process may select a default parameter if one could not be extracted from the source files. For example, the process may select a default layout or other display attribute for a user interface component if not specified. A machine learning based approach may infer the parameter based on patterns learned from a training dataset comprised of example user interfaces. Techniques for inferring parameters based on machine learning are described in further detail below.

In some embodiments, the process determines whether there are any remaining components to add to the metadata file (operation 216). If so, then the process may return to operation 206 and repeat until all user interface components in the source files have been analyzed.

Once complete, the process stores the metadata file for the user interface (operation 218). The process may also store version information, which may be mapped to the metadata file as described in further detail below.

Referring again to FIG. 3, metadata file 302 depicts an example language-independent representation of source file 300. As illustrated, metadata file defines the user interface components using JavaScript Object Notation (JSON). However, other normalized formats may be used, such as the Extensible Markup Language (XML). Metadata file 302 defines a hierarchical list of components, including layouts, a search component, a select component, and a table. The metadata further defines component parameters including the direction of the component, the name for each component, the size of the component, and data that is bound to the component. The metadata file may be used to migrate the user interface to other user interface frameworks and/or to allow for runtime updates to the interface without stopping or pausing execution of the application.

Figure 4:
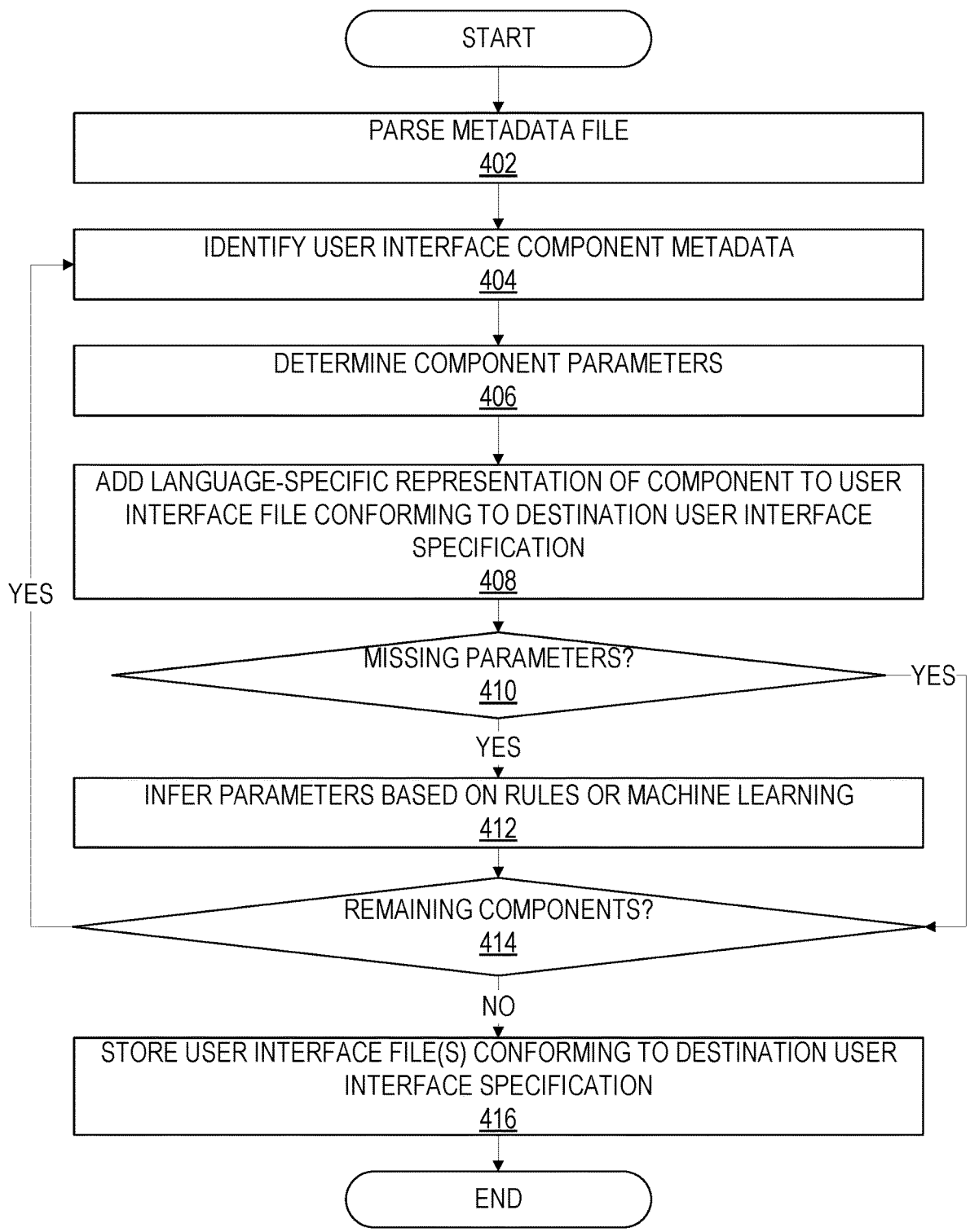
FIG. 4 illustrates an example set of operations for generating a set of language-dependent source files based on a set of language-independent metadata in accordance with some embodiments.

3.2 Generating Language-Specific User Interface Files from Language-Independent Metadata If a user would like to migrate a user interface to other user interface framework, then the user may invoke translation engine 106 to generate a set of framework-specific user interface files based on the metadata representation. FIG. 4 illustrates an example set of operations for generating a set of language-dependent source files based on a set of language-independent metadata in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, the process parses a metadata file for translation to a file compatible with a destination user interface framework (operation 402).

In some embodiments, the process identifies user interface component metadata while parsing the metadata file (operation 404). For example, the process may parse metadata file 302 to identify the layout, search, select, and table components. Certain components, such as classes and packages, may be specific to a particular framework, which may not be represented in metadata or may not have any meaning outside of the particular framework. In such cases, the process may jump ahead to operation 216.

The process further determines the component parameters and layout (operation 406). With respect to the search component in metadata file 302, for instance, the process may determine the component name, identifier, label, direction, and/or other parameters.

Based on the component metadata and parameters, the process adds a language-specific representation of the component to a user interface file conforming to a destination user interface specification (operation 408). The process may translate the component metadata differently depending on the particular user interface specification that is the target of the translation. For example, the process may map the component identifier and parameters to a particular syntax and/or set of declarative language statements that conforms with the user interface specification.

In some embodiments, the process determines whether there are missing parameters (operation 410). Certain components, such as classes and packages, may be specific to a particular framework, which may not be feasible to represent in metadata or may not have any meaning outside of the particular framework. Additionally or alternatively, the metadata representation may not specify a display parameter of a component if not specified in the original source files from which the metadata representation was generated.

If a parameter is missing, in some embodiments, the process infers the parameter based on the rules or machine learning (operation 412). As an example rule-based approach, the process may select a default parameter if one could not be extracted from the metadata file. For example, the process may select a default display parameter or add an invocation to a particular class method that is specific to the destination file programming language. A machine learning based approach may infer the parameter based on patterns learned from a training dataset comprised of example user interfaces. Techniques for inferring parameters based on machine learning are described in further detail below.

In some embodiments, the process determines whether there are any remaining components to add to the destination user interface files (operation 414). If so, then the process may return to operation 404 and repeat until all user interface components in the metadata representation have been translated to the destination syntax and added to the destination files.

Once complete, the process stores the user interface files conforming to the destination user interface specification (operation 416). The destination files may then be used to render the user interface by an interface engine implementing the corresponding user interface framework.

Figure 5:
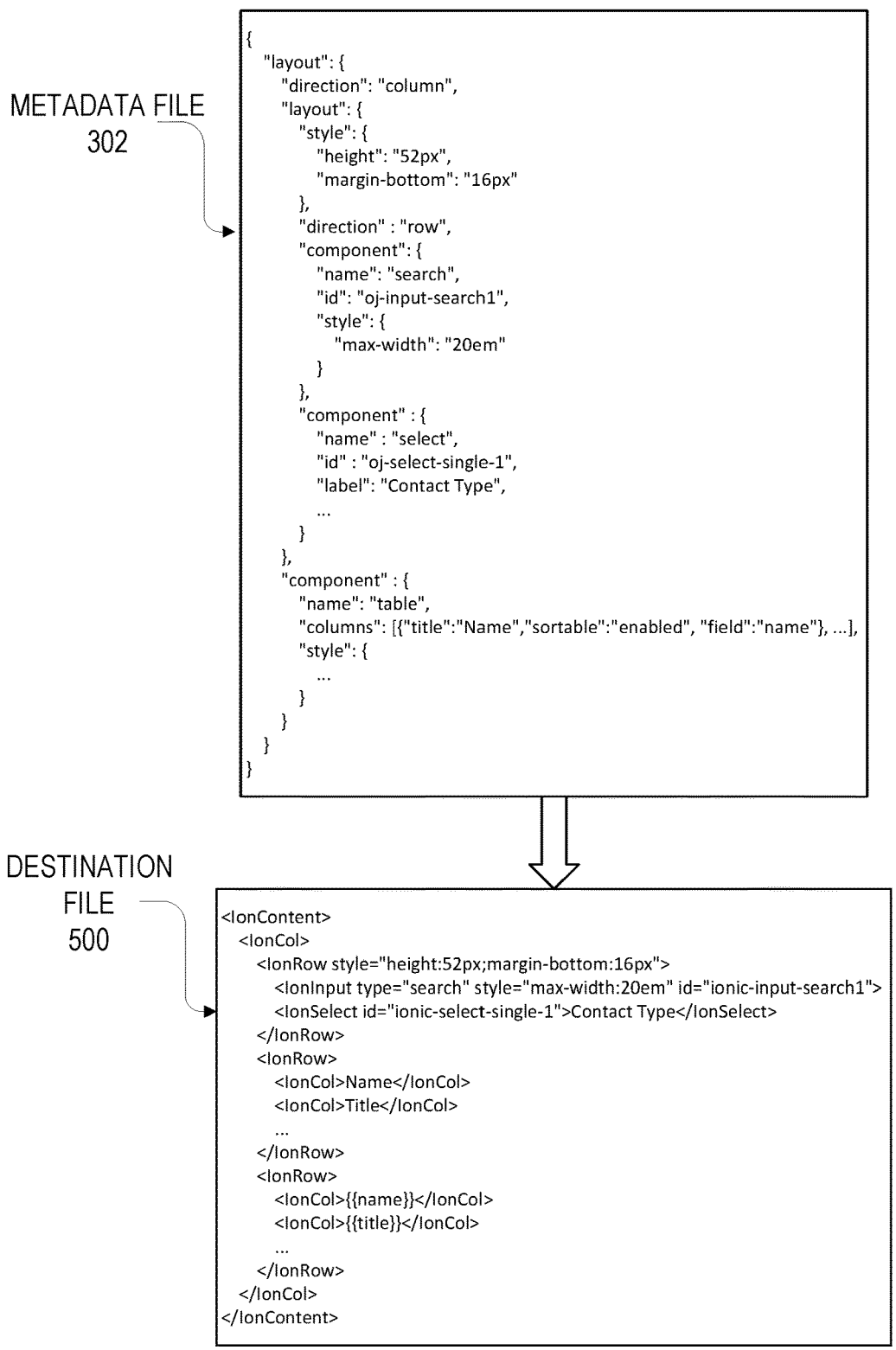
FIG. 5 illustrates an example conversion of a language-independent metadata document to a language-dependent user interface document.

FIG. 5 illustrates an example conversion of a language-independent metadata document to a language-dependent user interface document. In particular metadata file 302, which defines a set of user interface components in JSON, is converted to destination file 500. Destination file 500 defines the user interface page in a syntax that conforms to the Ionic Framework. However, the destination format may vary depending on the particular implementation.

The bi-directionality of metadata service 102 provides flexibility to user interface designers. For example, an application user interface may implement a particular framework. Metadata service 102 may translate the user interface code and files to a different format. A UI designer may then customize the interface using tools that are specific to a different framework. Once complete, the user interface may be mapped back to the format native to the application. The user interface may be updated during runtime as described further below.

3.3 Machine Learning Inferences

As previously mentioned, the process described above may use machine learning to infer parameters of user interface components, as defined in the metadata or in native user interface files. A machine learning process may include self-learning algorithms that can be iterated to learn a target model f that best maps a set of input variables to an output variable, using a set of training data. With supervised learning, the training data includes datasets and associated labels. With unsupervised learning, the training dataset may be unlabeled. The associated labels, if any, may be associated with the output variable of the target model f. The training data may be updated based on, for example, feedback on the accuracy of the current target model f. Updated training data is fed back into the machine learning algorithm, which in turn updates the target model f.

A machine learning algorithm may generate a target model f such that the target model f best fits the datasets of training data to the labels of the training data. Additionally or alternatively, a machine learning algorithm may generates a target model f such that when the target model f is applied to the datasets of the training data, a maximum number of results determined by the target model f matches the labels of the training data. Different target models be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering. Other example ML models include artificial neural networks and decision trees.

In some embodiments, ML engine 110 receives a set of user interface pages and metadata representations as input. ML engine 112 may train one or more ML models to predict which parameters to use given a set of feature values. The training process may extract features associated with the set of user interfaces, including the component parameter values that are present in the native and metadata representations, user attributes for users accessing the interfaces, and framework-specific attributes. The training process may form a feature vector based on values for features. For example, a value of 1 in the feature vector may indicate the presence of a user component or component parameter and 0 may indicate the absence of the component. The ML model may be trained using the feature vector to extrapolate patterns.

In some embodiments, the ML model may be applied to a set of metadata or a language-specific user interface file to estimate a label. For example, the metadata representation for a user interface page may be missing a value for the direction attribute. The trained ML model may predict whether the direction attribute is column or row based on the learned patterns from the training dataset. To apply the model, ML engine 110 may form a feature vector in the same manner as performed during the training process. The ML model may be applied to the feature vector to output a prediction for each attribute value. The attribute value with the highest probability may be selected and used in the file.

4. Runtime User Interface Updates 4.1 Metadata Repository

In some embodiments, metadata repository 116 stores framework independent documents generated by metadata service 102 for runtime application 120. Metadata repository 116 may further store multiple metadata representations and user interfaces are updated for runtime application 120. The metadata representation may be mapped to corresponding versions and change history.

Table 1 below provides an example set of metadata that may be stored in metadata repository 116. The example is a table of attributes that track version and change history. However, the set of attributes stored for each version of the metadata representation may vary depending on the particular implementation.

TABLE 1

Example entries in metadata repository

| id | json | Version | Last update date | Last update by | De- precated |
|---|---|---|---|---|---|
| Contact-list | { . . . } | 3 | Oct-5-21 5:00pm | John M | false |
| Contact-list | { . . . } | 2 | Sep-18-21 3:20pm | Vik s | false |
| Contact-list | { . . . } | 1 | Sep-18-21 2:42pm | John M | true |
| Product-view | { . . . } | 1 | Oct-5-21 1:00pm | Steve | false |
| Account-create | { . . . } | 2 | Jan-13-21 11:00am | Kamyar S | false |
| Account-create | { . . . } | 1 | Nov-19-20 5:00pm | Kamyar S | false |

Referring to Table 1, the metadata entries map different metadata representations to the following set of attributes:

id: an identifier, such as a filename, for a UI page that uniquely identifies a specific page in runtime application 120;

json: a field that stores the output of metadata engine 104 corresponding to a framework-independent document as previously described;

Version: a running number to track how many times a document is modified with the highest number representing most recent changes to the document;

Last update date and update by: audit columns to know who and when the changes were made to the user interface;

Deprecated: a Boolean value that tracks whether a particular version is deprecated or not.

In some embodiments, metadata repository 116 may phase out older versions of the user interface. For example, metadata repository 116 may delete metadata for versions that are older than a threshold age. Additionally or alternatively, metadata repository 116 may maintain only a threshold number of versions of the user interface and delete the oldest version as new versions are created.

Configuration interface 112 may access one or more attributes from metadata repository 116 to perform customization, versioning, release, and/or rollback operations, as described further below.

4.2 Configuration Management

As previously mentioned, UI designers 126 may access and update a user interface concurrently while application users 122 are interacting with the user interface of runtime application 120. In some embodiments, UI designers 126 may concurrently add new data entry fields, rearrange fields, delete fields, and/or other modify UI components. The edits may not impact a page being currently viewed by an application user until the page is released or "published" by UI designer 126. Once published, runtime application 120 may refresh multipage navigable interface 118 to add data entry fields, rearrange fields, delete fields, and/or otherwise update the set of UI components that are visible and accessible to the end user via the application page that the user is currently viewing.

Figure 6:
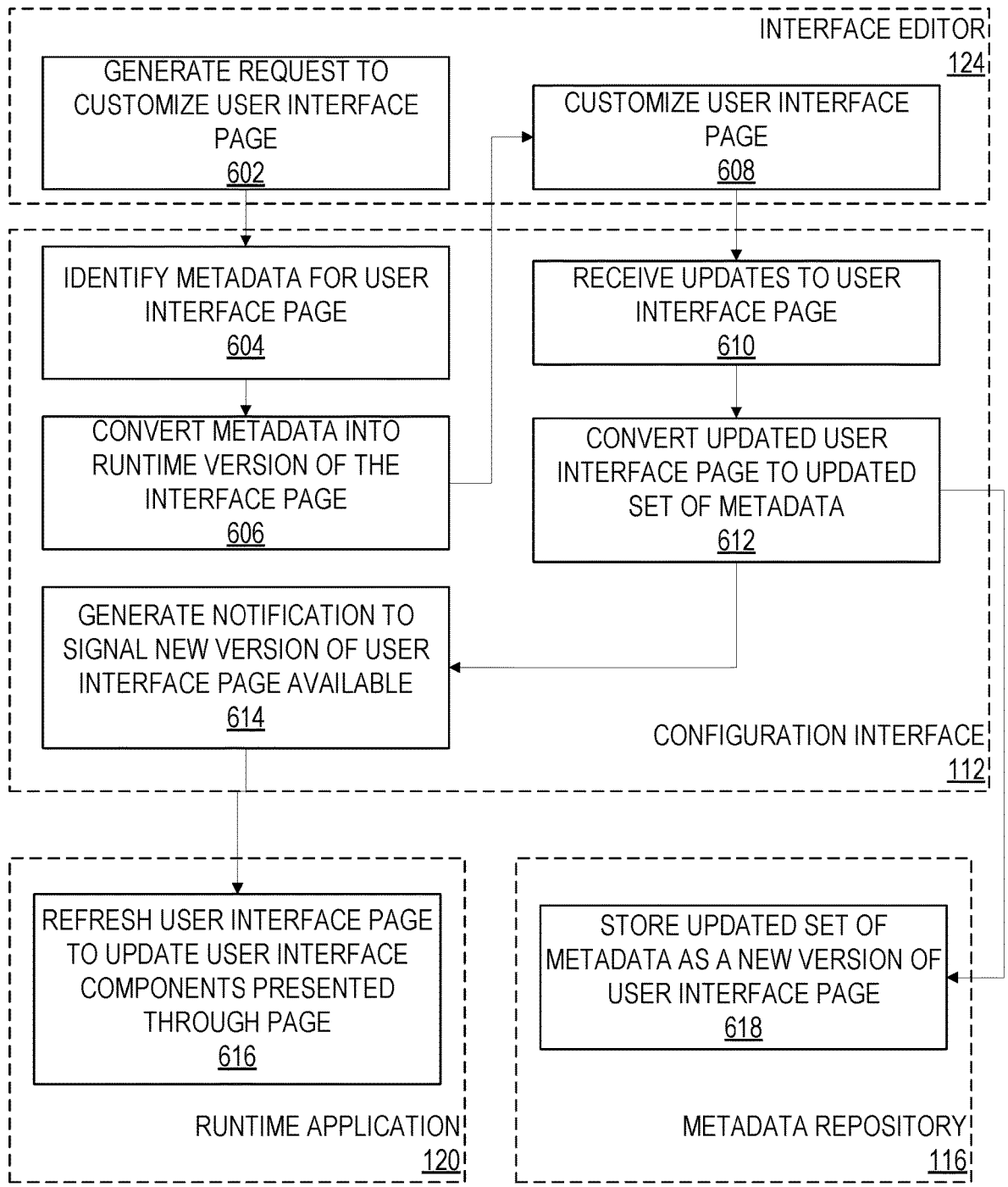
FIG. 6 illustrates an example dataflow diagram and set of operations for publishing and releasing an updated user interface application during application runtime in accordance with some embodiments.

FIG. 6 illustrates an example dataflow diagram and set of operations for publishing and releasing an updated user interface application during application runtime in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

Referring to FIG. 6, interface editor 124 generates a request to customize a user interface page (operation 602). The request may be generated, for example, based on user input to customize the current interface of runtime application 120.

Responsive to the request, configuration interface 112 identifies a set of metadata for the user interface page (operation 604). In some embodiments, configuration interface 112 retrieves the metadata for the most recent version of the user interface page, which may be the one with the highest version number in metadata repository 116. In other cases, the user may request to view an older version of the user interface, in which case, configuration interface 112 may retrieve metadata for the version specified in the request.

In some embodiments, configuration interface 112 converts the metadata into a runtime version of the interface page (operation 606). Configuration interface 112 may use translation engine 106 to perform the conversion, which may translate a metadata file into one or more user interface files that conform with a target user interface specification, as previously described. For example, a JSON document specification may be converted into a framework-specific runtime version of a page. The page may then be rendered, and presented for customization by an end user. Additionally or alternatively, the user may edit the underlying code and/or metadata representation of the page.

In some embodiments, the user customizes the user interface page via interface editor 124 (operation 608). For example, the user may reorder fields, add new fields, change layout or styling, and/or otherwise modify the UI components. Interface editor 124 may present an option to save and/or publish the updates to a user interface.

If the user saves or publishes the updates, then configuration interface 112 receives the updates to the user interface page (operation 610).

Configuration interface 112 further converts the updated user interface page to an updated set of metadata (operation 612). Configuration interface 112 may invoke metadata engine 104 to perform the conversion, which may translate the runtime user interface files to a metadata file, as previously described. For example, the framework-specific runtime version of a page may be translated to a JSON document specification.

If the user has published or otherwise released the updated version of the user interface, then configuration interface generates a notification to signal that a new version of the user interface is available (operation 614). Although in the present example, the signal is provided to a single runtime application, in other embodiments, the notification may be sent to multiple runtime applications, such as in the case where there are several instances of the application deployed across multiple host devices. In this scenario, multiple users may be concurrently accessing one or more UI pages of the application, one or more of which may be updated at runtime responsive to the notification.

Responsive to detecting the notification, runtime application 120 refreshes the user interface page to update the set of user interface components presented through the page (operation 616). The refresh may be performed while the page is being viewed, and may cause the set of components that are visible and accessible to the end user viewing the page to change. For example, the page may present a data entry field that was not previously present before refreshing the page and without restarting the application. Additionally or alternatively, the refresh may cause the look and feel of the page to near instantaneously change.

In some embodiments, refreshing the page includes converting the updated metadata into one or more user interface files that conform with a runtime user interface specification. The specification may be the same or different as the one used to perform the customization of the user interface page. In other embodiments, the page may be rendered directly based on the metadata representation without translating the metadata file to a framework-specific format.

When the user saves or publishes an updated user interface, metadata repository 116 further stores the updated set of metadata as a new version of the user interface page (operation 618). Metadata repository 116 may map one or more of the attributes depicted in Table 1 to the set of metadata.

4.3 Rollback Operations

In some cases, UI designers 126 may wish to rollback to a previous version of a user interface, such as if errors or other problems with an updated user interface arise. In these, cases, the user may request a rollback operation with minimal input, such as with the click of a "rollback" button. The user may be given the option to select a particular version of a user interface. If the user does not specify a version, then system 100 may rollback to the most recent user interface version that has not been deprecated.

Figure 7:
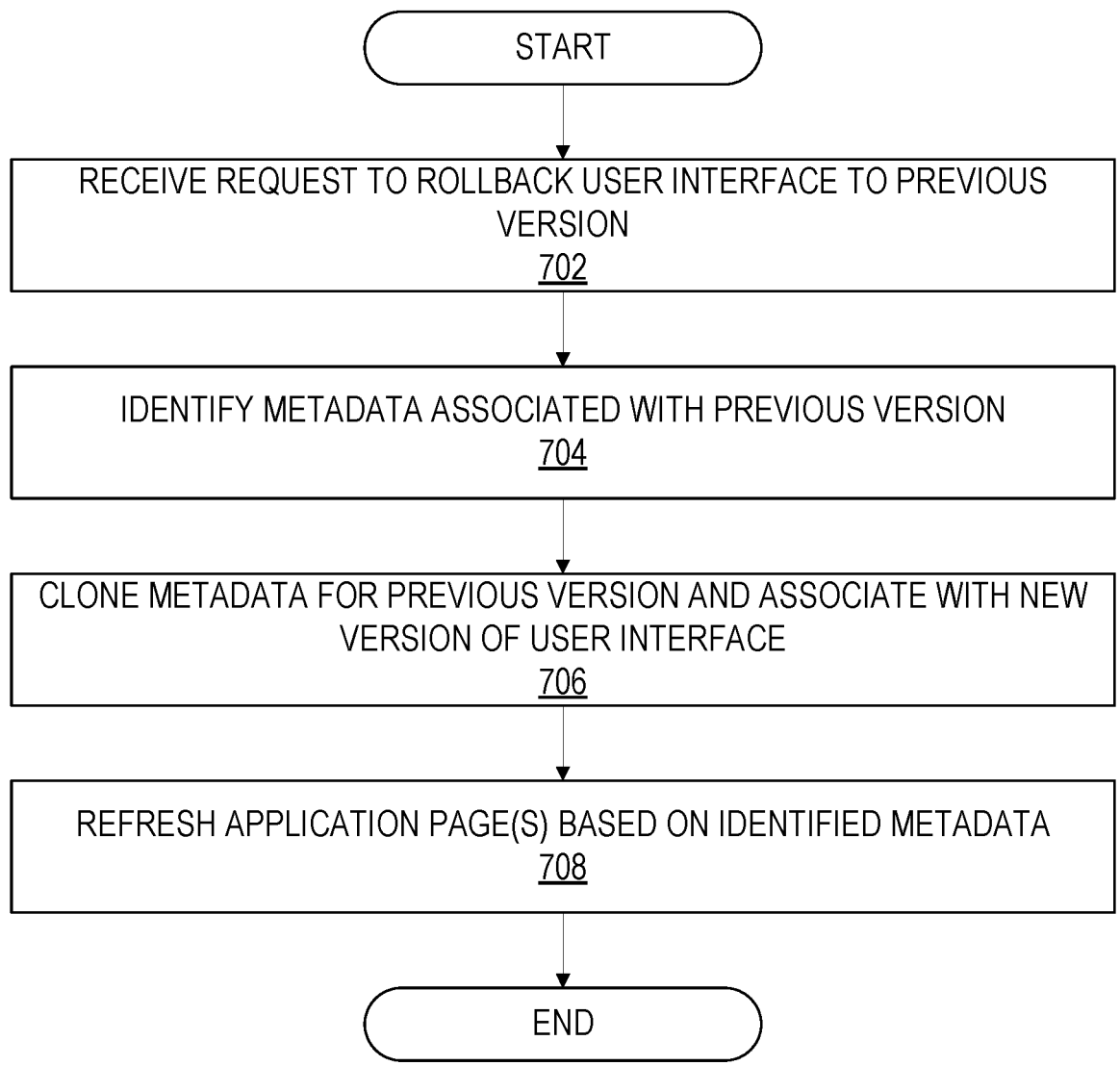
FIG. 7 illustrates an example set of operations for rolling back a user interface in accordance with some embodiments.

FIG. 7 illustrates an example set of operations for rolling back a user interface in accordance with some embodiments. One or more operations illustrated in FIG. 7 may be modified, rearranged, or omitted all together. Accordingly, the particular sequence of operations illustrated in FIG. 7 should not be construed as limiting the scope of one or more embodiments.

Referring to FIG. 7, the process receives a request to rollback the user interface to a previous version (operation 702). As indicated above, the user may specify a version or the most recent non-deprecated version may be selected by default.

The process next identifies metadata associated with the previous version of the user interface (operation 704). For example, the process may fetch the metadata from the json field of the corresponding entry in metadata repository 116.

In some embodiments, the process clones the metadata for the previous version and associates the metadata with a new version of the user interface (operation 706). Creating a new entry in metadata repository 116 allows the full history of changes to the user interface to be tracked. Further, the new entry and version number provides a signal of which version of the user interface to render for an application at runtime.

The process further refreshes one or more application pages based on the identified metadata for the previous version of the user interface (operation 708). Refreshing the application may cause user interface elements to be added, rearranged, or otherwise modified as previously described.

In some embodiments, when a user rolls back from a version of the user interface version, the process marks the version as deprecated. For example, a deprecation flag may be set to signal problems were encountered with the corresponding version of the user interface. Future rollbacks or customizations may determine which versions are deprecated to avoid using these versions of the user interface in the future.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
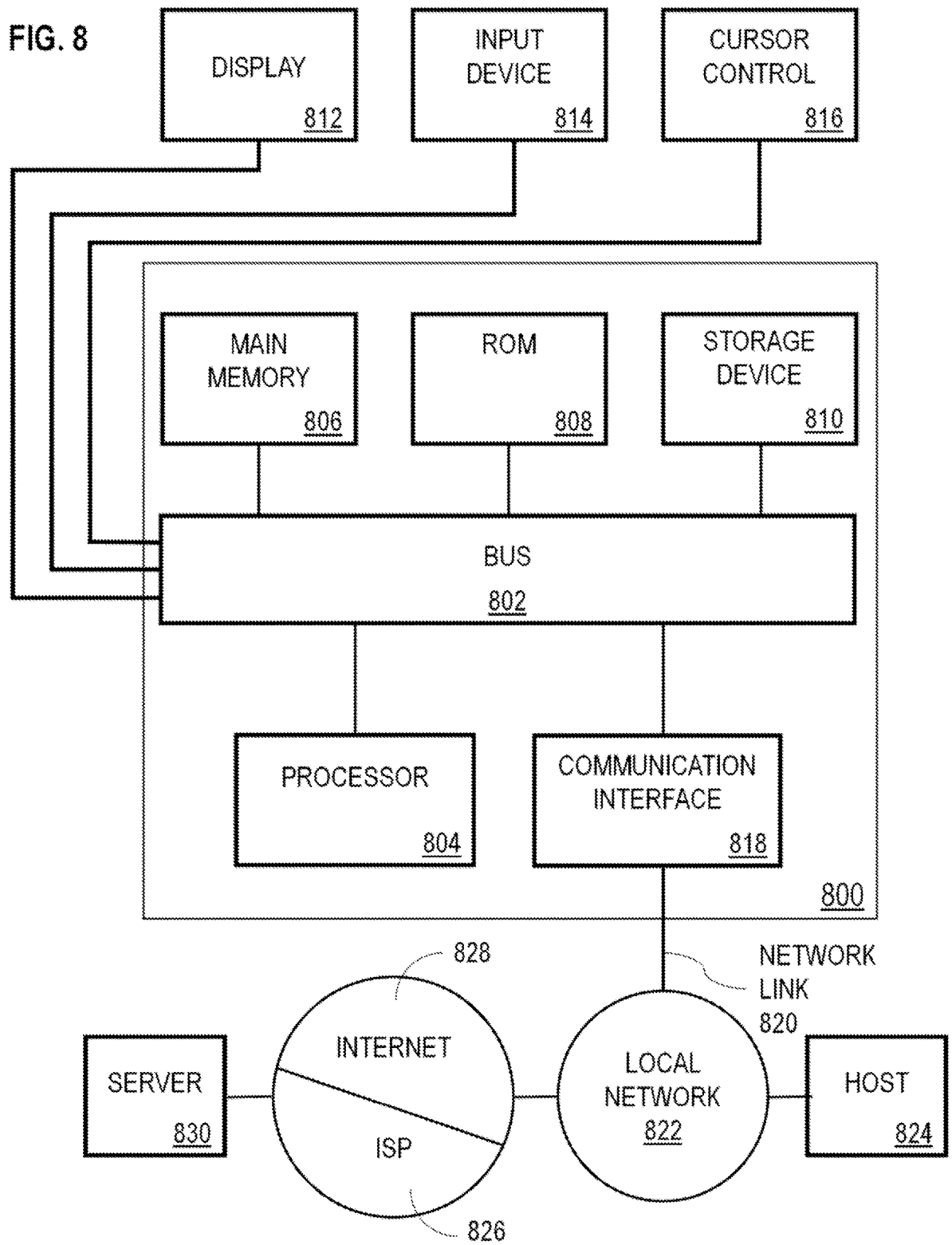
FIG. 8 shows a block diagram that illustrates a computer system in accordance with one or more embodiments.

For example, FIG. 8 is a block diagram that illustrates computer system 800 upon which an embodiment of the invention may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause:
   receiving a first set of one or more user interface files that includes code for rendering an updated user interface within an application, wherein a syntax of the code conforms to a first user interface specification;
   converting, by a metadata service, the first set of one or more user interface files to at least one metadata file that includes metadata defining the updated user interface in a format independent of the first user interface specification;
   refreshing, by the application during runtime based on the metadata defining the updated user interface for the application, a page that is currently being viewed by one or more users of the application, wherein refreshing the page modifies a set of one or more user interface components presented on the page by:
      converting the at least one metadata file to a second set of one or more user interface files for rendering the updated user interface, wherein the second set of one or more user interface files include code in a second syntax conforming to a second user interface specification that is different than the first user interface specification;
      providing, as an input to a machine learning model during runtime of the application as the page is currently being viewed by the one or more users, a feature vector that is generated as a function of at least a first set of attributes extracted from a native representation of the page and a second set of attributes extracted from a metadata representation of the page within the metadata file, wherein the machine learning model infers, based on the native representation and the metadata representation, at least one visual property for a language-specific component, added to the second set of one or more user interface files, that is not specified in the metadata file and that is required to render the updated user interface for the application according to the second user interface specification;
      rendering the page using the second set of one or more user interface files that conform to a second user interface specification and include the at least one visual property inferred for the language-specific component.

2. The media of claim 1, wherein the first set of one or more user interface files includes a file in a programming language that conforms to the first user interface specification; wherein the format is independent of the programming language.

3. The media of claim 1, wherein refreshing the page causes the page to present a data entry field that was not previously present before refreshing the page and without restarting the application.

4. The media of claim 1, wherein the instructions further cause: training the machine learning model using an example set of user interfaces; wherein said training includes forming, by a training process, a set of feature vectors based on native and metadata representations associated with the example set of user interfaces; wherein attribute values in the set of feature vectors indicate a presence or absence of user interface components; wherein the at least one visual property is inferred based on learned patterns in the example set of user interfaces.

5. The media of claim 1, wherein the instructions further cause: storing the metadata defining the updated user interface in a metadata repository that maps different versions of the user interface for the application to different sets of metadata.

6. The media of claim 5, wherein the instructions further cause: receiving a request to rollback the user interface for the application; and responsive to receiving the request, identifying a set of metadata mapped to a previous version of the user interface in the metadata repository; and refreshing the page in the application based on the set of metadata mapped to the previous version of the user interface.

7. The media of claim 6, wherein the instructions further cause: generating a clone of the set of metadata mapped to the previous version of the user interface; and adding the clone of the set of metadata to the metadata repository; and mapping the clone of the set of metadata to a new version of the user interface.

8. The media of claim 1, wherein refreshing the page is performed without restarting the application.

9. A system comprising:
   one or more hardware processors;

one or more non-transitory computer-readable media storing instructions which, when executed by the one or more hardware processors, cause:
receiving a first set of one or more user interface files that includes code for rendering an updated user interface within an application, wherein a syntax of the code conforms to a first user interface specification;
converting, by a metadata service, the first set of one or more user interface files to at least one metadata file that includes metadata defining the updated user interface in a format independent of the first user interface specification;
refreshing, by the application during runtime based on the metadata defining the updated user interface for the application, a page that is currently being viewed by one or more users of the application, wherein refreshing the page modifies a set of user interface components presented on the page by:
converting the at least one metadata file to a second set of one or more user interface files for rendering the updated user interface, wherein the second set of one or more user interface files include code in a second syntax conforming to a second user interface specification that is different than the first user interface specification;
providing, as an input to a machine learning model during runtime of the application as the page is currently being viewed by the one or more users, a feature vector that is generated as a function of at least a first set of attributes extracted from a native representation of the page and a second set of attributes extracted from a metadata representation of the page within the metadata file, wherein the machine learning model infers, based on the native representation and the metadata representation, at least one visual property for a language-specific component, added to the second set of one or more user interface files, that is not specified in the metadata file and that is required to render the updated user interface for the application according to the second user interface specification;
rendering the page using the second set of one or more user interface files that conform to a second user interface specification and include the at least one visual property inferred for the language-specific component.

10. A method comprising:
receiving a first set of one or more user interface files that includes code for rendering an updated user interface within an application, wherein a syntax of the code conforms to a first user interface specification;
converting, by a metadata service, the first set of one or more user interface files to at least one metadata file that includes metadata defining the updated user interface in a format independent of the first user interface specification;
refreshing, by the application during runtime based on the metadata defining the updated user interface for the application, a page that is currently being viewed by one or more users of the application, wherein refreshing the page modifies a set of user interface components presented on the page by:
converting the at least one metadata file to a second set of one or more user interface files for rendering the updated user interface, wherein the second set of one or more user interface files include code in a second syntax conforming to a second user interface specification that is different than the first user interface specification;
providing, as an input to a machine learning model during runtime of the application as the page is currently being viewed by the one or more users, a feature vector that is generated as a function of at least a first set of attributes extracted from a native representation of the page and a second set of attributes extracted from a metadata representation of the page within the metadata file, wherein the machine learning model infers, based on the native representation and the metadata representation, at least one visual property for a language-specific component, added to the second set of one or more user interface files, that is not specified in the metadata file and that is required to render the updated user interface for the application according to the second user interface specification;
rendering the page using the second set of one or more user interface files that conform to a second user interface specification and include the at least one visual property inferred for the language-specific component.

11. The method of claim 10, wherein the first set of one or more user interface files includes a file in a programming language that conforms to the first user interface specification; wherein the format is independent of the programming language.

12. The method of claim 10, wherein refreshing the page causes the page to present a data entry field that was not previously present before refreshing the page and without restarting the application.

13. The method of claim 10, further comprising: training the machine learning model using an example set of user interfaces; wherein said training includes forming, by a training process, a set of feature vectors based on native and metadata representations associated with the example set of user interfaces; wherein attribute values in the set of feature vectors indicate a presence or absence of user interface components; wherein the at least one visual property is inferred based on learned patterns in the example set of user interfaces.

14. The method of claim 10, further comprising:
storing the metadata defining the updated user interface in a metadata repository that maps different versions of the user interface for the application to different sets of metadata;
receiving a request to rollback the user interface for the application; and
responsive to receiving the request:
identifying a set of metadata mapped to a previous version of the user interface in the metadata repository;
generating a clone of the set of metadata mapped to the previous version of the user interface;
mapping the clone of the set of metadata to a new version of the user interface;
and refreshing the page in the application based on the set of metadata mapped to the clone.

15. The method of claim 10, wherein refreshing the page is performed without restarting the application.

16. The method of claim 10, wherein the machine learning model infers at least one metadata parameter for the metadata representation based on code within the first set of one or more user interface files.

17. The method of claim 16, wherein the machine learning model is applied responsive to determining that component metadata is missing from the metadata file.

18. The method of claim 17, wherein the component metadata is missing from at least one of a class-specific package or a class object.

19. The method of claim 17, wherein the component metadata is an expected visual parameter that the metadata service is not able to extract from the first set of one or more user interface files.

* * * * *